March 24, 1959 — L. E. PETERSON — 2,878,835
FLEXIBLE DIAPHRAGM FOR PULSATION DAMPENERS AND THE LIKE
Filed Feb. 21, 1955 — 2 Sheets-Sheet 1

INVENTOR.
LAWRENCE E. PETERSON
BY
R. L. Miller
ATTORNEY

March 24, 1959 L. E. PETERSON 2,878,835
FLEXIBLE DIAPHRAGM FOR PULSATION DAMPENERS AND THE LIKE
Filed Feb. 21, 1955 2 Sheets-Sheet 2
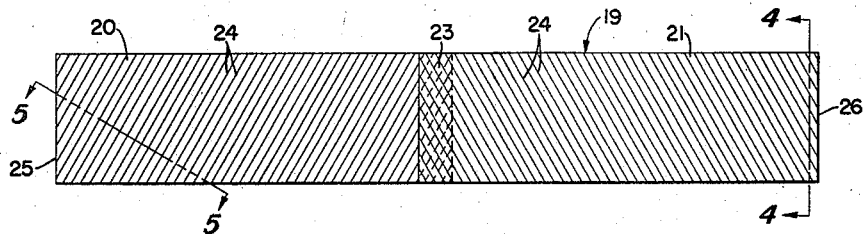
FIG. 3
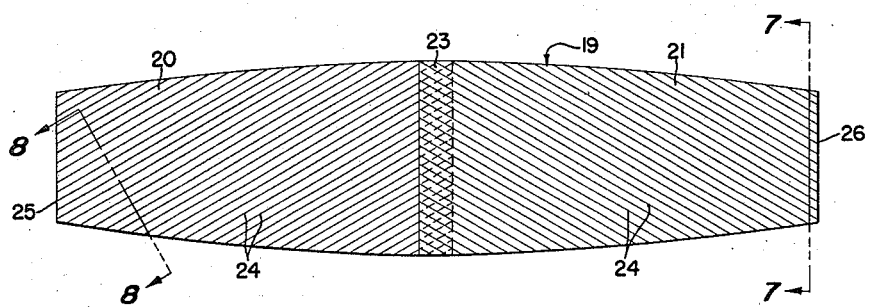
FIG. 6
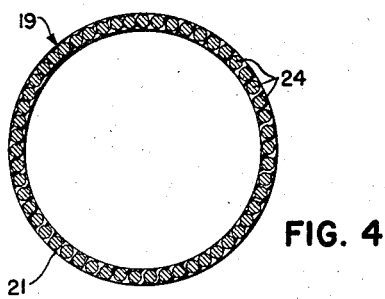
FIG. 4
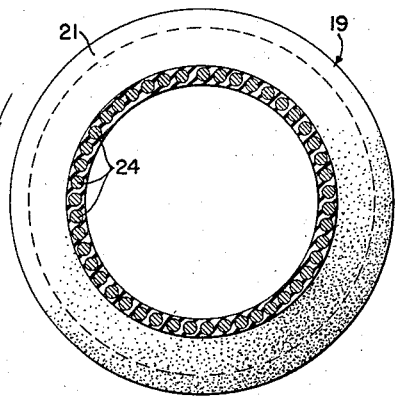
FIG. 5 FIG. 7
FIG. 8
*INVENTOR.*
LAWRENCE E. PETERSON
BY
*R. L. Miller*
ATTORNEY

United States Patent Office 2,878,835
Patented Mar. 24, 1959

2,878,835

FLEXIBLE DIAPHRAGM FOR PULSATION DAMPENERS AND THE LIKE

Lawrence E. Peterson, Hermosa Beach, Calif., assignor to The Goodyear Tire & Rubber Company, Akron, Ohio, a corporation of Ohio Application February 21, 1955, Serial No. 489,620

3 Claims. (Cl. 138—30)

This invention is directed to improvements in pulsation dampeners for dampening or absorbing the pulsations in a liquid stream. More particularly, the invention is directed to a tubular diaphragm for use in a pulsation dampener or absorber wherein the diaphragm is radially expanded by internal fluid pressure against external gaseous pressures with the ends of the diaphragm secured against axial and rotational movement.

It is well known in the art that the liquid stream in the outlet line of a reciprocating pump has a cyclic variation in pressure. In many installations of reciprocating pumps and particularly in high pressure installations it is desirable that the pulsations in the liquid stream be suppressed or dampened. Heretofore, pulsation dampeners have employed diaphragms made of solid rubber or other resilient material which have been either totally inadequate or have ruptured in a relatively short period of time.

It is an object of this invention to provide a tubular diaphragm for use in high pressure pulsation dampeners, absorbers, accumulators and the like, which is radially expandable even though the ends of the diaphragm are secured against axial and rotational movement.

It is a further object of this invention to provide a tubular diaphragm for use in pulsation dampeners, absorbers, accumulators and the like which is reinforced with cord fabric and which is radially expandable even though the ends of the diaphragm are secured against axial and/or rotational movement.

Fig. 3 is a plan view of the diaphragm of this invention showing the positions of the cords prior to expansion of the diaphragm of this invention.

Fig. 4 is a cross sectional view taken along the lines 4—4 of Fig. 3.

Fig. 5 is a cross sectional view taken along the lines 5—5 of Fig. 3.

Fig. 6 is a plan view of the diaphragm of this invention showing the position of the cords when the diaphragm is expanded.

Fig. 7 is a cross sectional view taken along the lines 7—7 of Fig. 6.

Fig. 8 is a cross sectional view taken along the lines 8—8 of Fig. 6.

Figure 1:
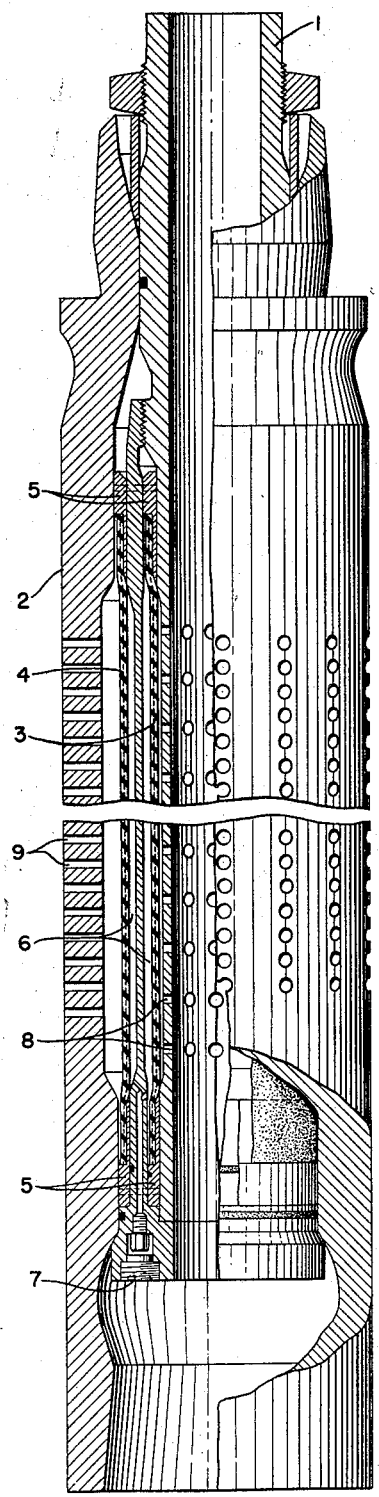
Fig. 1 is a partial longitudinal, sectional view through a pulsation dampener employed in well drilling apparatus employing the tubular diaphragm of the present invention.

Referring to Fig. 1 of the drawings, the apparatus shown is adapted for use in drilling wells. Drilling fluid passes through the drilling bit, through the tubular member 1 and returns from the bit outwardly of the tubular member 2. Flexible diaphragms 3 and 4 are secured at each end by suitable clamps 5 to form a gas-tight chamber 6 between the outer surface of the diaphragm 3 and the inner surface of the diaphragm 4. The chamber 6 is charged with a suitable gas, preferably an inert gas such as nitrogen through the valve 7. The diaphragms 3 and 4 are restricted in radial movement respectively by tubular members 1 and 2 on one side thereof and the enclosed gas on the other side thereof. Pulsations in the pressure of the fluid passing through the perforations 8 of member 1 cause the diaphragm 3 to expand radially against the pressurized gas in chamber 6 and diaphragm 4 to expand against the pressure of the returning fluid passing through perforations 9 of member 2, thereby dampening or absorbing the pulsations.

Figure 2:
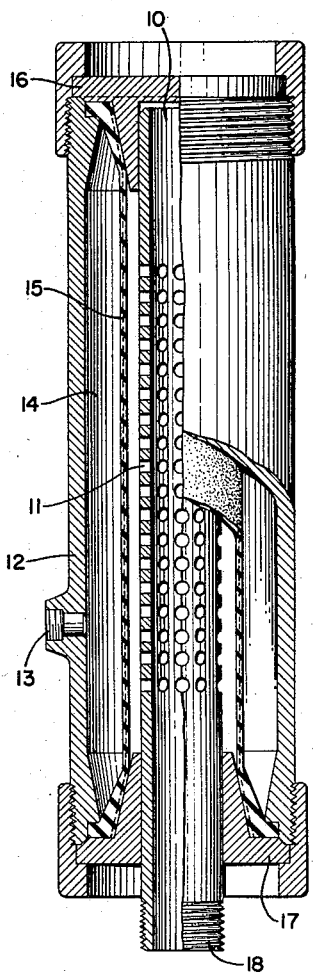
Fig. 2 is a partial longitudinal sectional view through a pulsation dampener employed in pumping systems employing the tubular diaphragm of this invention.

In Fig. 2 of the drawings a pulsation dampener constructed in accordance with U.S. Patent 2,583,231 is shown. Fluid pressure enters one end of the cylindrical member 10 having perforations 11. The outer casing 12 is provided with a valve 13 through which a gas such as compressed air may be admitted to the chamber 14 formed by the inner surface of the casing 12 and the flexible diaphragm 15 which is clamped against rotational and axial movement by the members 16 and 17. The cylindrical member 10 is provided with a threaded extension 18 which permits the dampener to be connected to a liquid pumping system and it is seen that fluid pressure applied to the inner surface of the diaphragm 15 causes the diaphragm to expand radially against the pressure of the gas in chamber 14, thereby dampening the pulsating pressure of the liquid.

Referring to Figs. 3 through 8, a flexible diaphragm 19 is shown for use in pulsation dampeners, absorbers, accumulators and the like of the general construction shown in Figs. 1 and 2 of the drawings. The diaphragm 19 is made of cord embedded in rubber to form plies. The plies are cut on the bias or at an angle to the longitudinal axis of the cord to form cylindrical sections 20 and 21 which are lap-spliced circumferentially at 23 to form the tubular diaphragm 19. The individual cords 24 are made of high-strength filaments or fibers such as nylon or rayon and are preferably formed of continuous filaments. However, for the purposes of this invention the cords 24 may be made of any material having high tensile strength and high mechanical flexibility. The cords 24 in the cylindrical sections 20 and 21 extend substantially parallel to each other in a helical path with the cords 24 in section 20 extending from the end 25 in a counter-clockwise direction toward the spliced portion 23 and the cords in the section 21 extending from the end 26 in a clockwise direction toward the splice 23. Otherwise stated, the cords in each of the successive sections 20 and 21 alternate directions relative to the end 25.

When fluid pressure is applied to the internal surface of the diaphragm 19, with the ends 25 and 26 restrained from axial movement and from rotation, the diaphragm expands radially and the stresses cause the cords 24 to assume a shorter path from the ends of the diaphragm to the splice 23 thereby decreasing the helical angle. Since the ends 25 and 26 are fixed, the expansion force causing the cords to assume a lower helical angle results in rotation of the diaphragm 19 in a direction opposite to that of the helices of the cords in each section as indicated in Fig. 7 of the drawings. The degree of rotation increases in substantially direct proportion to the distance from the ends of the diaphragm. Likewise the radial expansion is greatest in the central portion of the diaphragm and decreases in proportion to the degree of rotation or the distance from the ends of the diaphragm. As the internal pressure is lowered the rotation of the diaphragm is reversed and the diaphragm contracts radially from the position shown in Fig. 6 to the position shown in Fig. 3. As shown in Fig. 5 of the drawings, the cords 24 are parallel and closely spaced when the tubular member is contracted, but as shown in Fig. 8, during expansion of the tubular member 19 the cords are displaced laterally from each other a progressively greater distance from the ends toward the center position or splice 23.

It is seen that this invention provides a tubular diaphragm having reinforcing cords to increase the bursting strength of the diaphragm but constructed as to permit radial expansion of the diaphragm without axial movement or rotation of the ends of the diaphragm.

Although this invention is illustrated and described as having a pair of sections with helical reinforcing cords, it is contemplated and obvious that the tubular diaphragm of this invention can be made from any reasonable number of sections, provided the direction of the helical path of the cords in each successive section is reversed.

While certain representative embodiments and details have been shown for the purpose of illustrating the invention, it will be apparent to those skilled in this art that various changes and modifications may be made therein without departing from the spirit or scope of the invention.

I claim:

1. A diaphragm for a pulsating dampener or absorber comprising a rubber tubular element which is flexible and radially expansible by fluid pressure applied internally of the element, said tubular element having a plurality of helically extending cords embedded therein, all of the cords extending from each end of the element being parallel to adjacent cords and extending in helical paths relative to the axis of the element, said cords terminating in a circumferential splice at the center portion of the element, the helical path of the cords extending from one end of the element being opposite in direction to the helical path of the cords extending from the other end of the element whereby as the diaphragm is expanded radially the center portion thereof rotates about the axis of the diaphragm.

2. A diaphragm for a pulsation dampener or absorber comprising a rubber tubular element which is flexible and radially expansible by fluid pressure applied internally of the element, said tubular element formed by at least two tubular sections of rubberized cord fabric, the end portion of each section circumferentially spliced to an axially adjacent section, the cords in each respective section being substantially parallel to each other and extending in the same helical path, the cords in each section extending in an opposite helical direction to the cords of the adjacent section to permit radial expansion of the sections while the ends of the diaphragm are secured a fixed distance apart.

3. A diaphragm as claimed in claim 2 in which the helix of said cord extends from the ends of said diaphragm in opposite directions toward the spliced area of said diaphragm.

References Cited in the file of this patent
UNITED STATES PATENTS

| | | |
|---|---|---|
| 610,310 | Sloper | Sept. 6, 1898 |
| 1,194,388 | Ives | Aug. 15, 1916 |
| 1,878,885 | Pahl | Sept. 20, 1932 |
| 2,310,776 | Jay | Feb. 9, 1943 |
| 2,472,483 | Krippendorf | June 7, 1949 |
| 2,609,001 | Hebard | Sept. 2, 1952 |
| 2,664,049 | Coberly | Dec. 29, 1953 |